(12) United States Patent
Harland et al.

(10) Patent No.: US 10,401,946 B1
(45) Date of Patent: Sep. 3, 2019

(54) POWER DELIVERY FOR PROCESSING UNITS

(71) Applicant: AMAZON TECHNOLOGIES, INC., Seattle, WA (US)

(72) Inventors: Jason Alexander Harland, Seattle, WA (US); Michael Jon Moen, Olympia, WA (US)

(73) Assignee: Amazon Technologies, Inc., Seattle, WA (US)

( * ) Notice: Subject to any disclaimer, the term of this patent is extended or adjusted under 35 U.S.C. 154(b) by 305 days.

(21) Appl. No.: 15/188,733

(22) Filed: Jun. 21, 2016

(51) Int. Cl.
*G06F 1/3296* (2019.01)

(52) U.S. Cl.
CPC .................. *G06F 1/3296* (2013.01)

(58) Field of Classification Search
CPC . G06F 1/26; G06F 1/3296; G06F 1/28; G06F 1/3203; G06F 1/3206; G06F 1/305; G06F 1/324; G06F 1/3243; Y02D 10/172; Y02D 10/126; G05F 1/46
See application file for complete search history.

(56) References Cited

U.S. PATENT DOCUMENTS

| | | | | |
|---|---|---|---|---|
| 6,694,272 B1* | 2/2004 | Zvonar | ................ | H02M 3/157 702/64 |
| 6,697,952 B1* | 2/2004 | King | ................ | G06F 1/26 327/538 |
| 6,885,233 B2* | 4/2005 | Huard | ................ | G05F 1/46 327/513 |
| 2003/0001664 A1* | 1/2003 | Nguyen | ................ | G05F 1/577 327/544 |
| 2004/0003301 A1* | 1/2004 | Nguyen | ................ | G06F 1/206 713/300 |
| 2004/0128565 A1* | 7/2004 | Horigan | ................ | G06F 1/26 713/300 |
| 2004/0133813 A1* | 7/2004 | Burnham | ................ | G06F 1/26 713/300 |
| 2009/0167282 A1* | 7/2009 | Koertzen | ................ | H02J 1/102 323/318 |
| 2009/0249092 A1* | 10/2009 | Lam | ................ | G06F 1/26 713/310 |
| 2010/0153755 A1* | 6/2010 | Chiu | ................ | G06F 1/28 713/300 |
| 2010/0169701 A1* | 7/2010 | Tu | ................ | G06F 1/3203 713/600 |
| 2012/0054503 A1* | 3/2012 | Hsiao | ................ | G06F 1/3206 713/300 |
| 2013/0290748 A1* | 10/2013 | Zhu | ................ | G06F 1/26 713/300 |

* cited by examiner

*Primary Examiner* — Jaweed A Abbaszadeh
*Assistant Examiner* — Brian J Corcoran
(74) *Attorney, Agent, or Firm* — Blank Rome LLP

(57) ABSTRACT

A system includes hardware logic circuit configured to execute power control software. The hardware logic circuit executes the power control software to receive a request from a processing unit for delivery of a power level corresponding to a first power state and determine that the processing unit should operate at a second power state, where the second power state is different than the requested first power state. The hardware logic circuit also executes the power control software to cause a power supply to deliver a power level corresponding to the second power state to the processing unit.

18 Claims, 4 Drawing Sheets

POWER DELIVERY FOR PROCESSING UNITS

BACKGROUND

Processing units such as a central processing unit or a graphics processing unit receive power from a power supply (e.g., a power field effect transistor) and, by way of a prescribed communication protocol, can request that the power supply provide more or less current and/or voltage. The various levels of power consumption are associated with corresponding levels of performance, and are referred to as power states. Further, a processing unit should be operated in an optimized state for its particular installation or associated system design, for example for improved performance, reduced power consumption, enhanced overall reliability, or the like.

BRIEF DESCRIPTION OF THE DRAWINGS

For a detailed description of various examples, reference will now be made to the accompanying drawings in which.

DETAILED DESCRIPTION

Figure 1A:
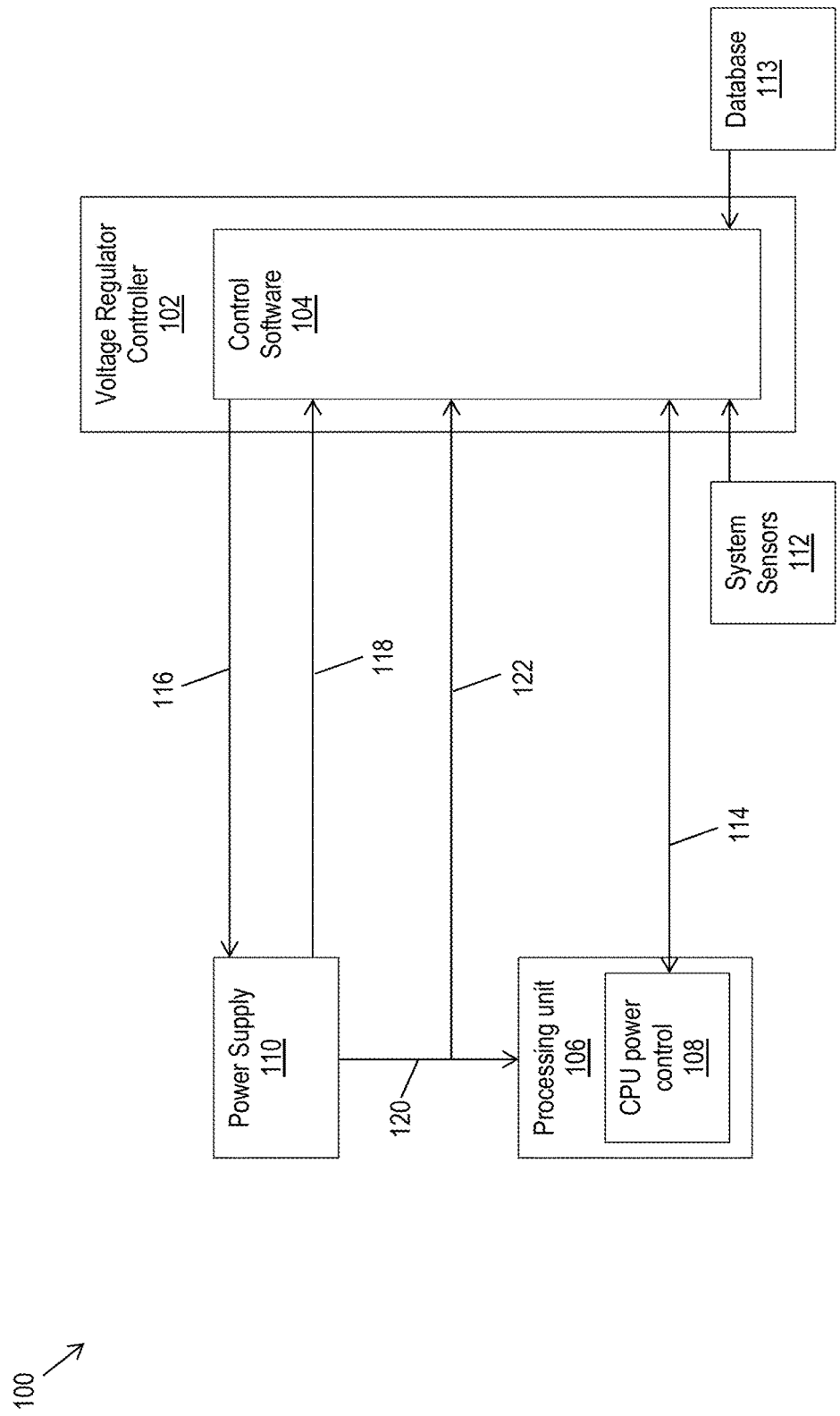
FIGS. 1a and 1b show illustrative block diagrams of systems for controlling power delivery to a processing unit in accordance with various examples of the present disclosure.

As explained above, processing units such as a central processing unit (CPU) or graphics processing unit (GPU) may be able to operate at different power states, which correspond to different levels of current, voltage, or power consumption. For example, to operate at a higher power state, a CPU may send a request to a voltage regulator controller, using a particular communication protocol, indicating that the CPU requires additional current be provided from a power supply. The voltage regulator controller interprets such a request and causes a power supply (e.g., through operation of a power field effect transistor (FET)) to supply the prescribed current at a particular voltage, for example 1.83V, to the CPU. However, despite the ability to tolerate a greater amount of current, the CPU may only be able to request a limited amount of current. In one example, the communication protocol between the CPU and the voltage regulator controller may utilize the Serial VID (SVID) interface, and thus the amount of specifiable current is limited to that which can be represented by 8 bits, or 255 A. The CPU is thus artificially limited to a performance level that is less than its maximum capability, since it can tolerate current beyond 255 A (or whatever upper limit is imposed by the communication protocol itself). For the purposes of this disclosure, it is assumed that P0 represents the highest power state (and thus the highest amperage requirement) for a particular CPU, while P1, P2, and so on represent sequentially lower power states having reduced amperage requirements.

Further, the CPU may be of a fixed design or "locked," in which the specifications relating to when the CPU requests to transition power state are both rigid and possibly overly-conservative in some cases. That is, the conditions under which the CPU requests to transition between power states are not programmable. For example, a CPU may request to transition to a lower power state when the CPU temperature rises above a certain level, possibly for a certain amount of time. However, depending on the system design, the CPU may be able to remain above a temperature threshold for a longer period of time than the specification permits while still remaining reliable, but due to the fixed design nature, the CPU would nevertheless request to transition to the lower power state. Thus, the fixed-design or locked CPU may not be able to operate in an optimized fashion for particular installations or associated system designs that would violate the CPU's operation specifications. Although an "unlocked" CPU may offer additional configuration options, such as parameters for transitioning between power states, unlocked CPUs are much more expensive than their "locked" or fixed design counterparts, and even then may suffer from limitations to the ability to request certain amounts of power imposed by the communication protocol itself, as explained above.

To address these and other related drawbacks, examples of the present disclosure are directed toward systems and methods for controlling power delivery to a processing unit (of which a CPU is one, non-limiting example). In particular, hardware, software, or combinations thereof act as intermediaries between the CPU, voltage control regulator, and power supply to overcome or avoid the shortcomings of legacy communication protocols for power control. In many circumstances those familiar with a particular system's design, cooling characteristics, performance requirements, and the like, may leverage that knowledge to configure examples of the present disclosure to allow a fixed-design CPU to operate at higher performance levels, higher performance levels for longer periods of time, and the like, where normally the fixed-design CPU would not permit such operation.

For example, assume that a power state of P0 corresponds to an amperage requirement of 300 A. Intermediary control software or hardware may determine, for example based on temperature data from a sensor, that the CPU may safely operate at P0, despite the fact that the CPU itself cannot request that amount of current from the voltage control regulator due to limitations imposed by the SVID interface (i.e., limited to requesting 255 A). In such a scenario, examples of the present disclosure include the intermediary software or hardware interjecting and, rather than using the CPU's request for certain amperage, causing the voltage regulator controller to generate a signal that causes the power supply to deliver 300 A to the CPU. In essence, the intermediary software or hardware "ignores" the request from the CPU because the intermediary is aware that the CPU can actually safely tolerate a higher power state or performance level. Additionally, the control software or hardware may provide a signal to the CPU indicating that the operating point is at 255 A (i.e., a value that is able to be understood, considering the limitations imposed by a communication protocol), despite the fact that the power supply is actually delivering 300 A. That is, in some cases, the control software or hardware provides a signal to the CPU indicating a delivered voltage and/or current that differs from the actual voltage and/or current being delivered by the power supply, effectively "spoofing" the CPU.

Thus, examples of the present disclosure overcome protocol-imposed limitations on a CPU's ability to request tolerable current and/or voltage levels. Additionally, the present disclosure may overcome protocol-imposed limitations on a voltage regulator's ability to operate above a maximum current and/or voltage levels that the CPU is able to request. Examples of the present disclosure may also leverage specific knowledge about a particular system design to operate CPUs at performance levels that would otherwise not be tolerated by a fixed-design or "locked" CPU. Further examples in accordance with the present disclosure are discussed in additional detail and with reference to the accompanying figures.

FIG. 1a shows a first example system 100 in accordance with embodiments of the present disclosure. The system 100 includes a voltage regulator controller 102 having power control software 104 implemented thereon. A processing unit 106, such as a CPU, is coupled to the voltage regulator controller 102, and itself includes a CPU power control block 108. The CPU power control 108 communicates with the voltage regulator controller 102 by way of a SVID interface 114. The voltage regulator controller 102 is coupled to a power supply 110 (e.g., a power FET) and controls the power/current delivery of the power supply 110 by modulating a pulse-width modulated (PWM) signal 116. The power supply 110 provides power to the CPU by way of input voltage rail 120, which may be for example at 1.83V. The voltage regulator controller 102 is also able to sense the voltage provided to the CPU 106 by way of voltage sense signal 122, and is able to sense the current provided by the power supply 110 by way of current monitoring ("IMon") signal 118. In certain examples of the present disclosure, the system 100 may also include one or more system sensors 112, which may comprise an ambient temperature sensor, a processing unit temperature sensor, a fan speed sensor, a fan ramp rate sensor, a processor package voltage sensor, an electronic component voltage sensor, and/or a processing unit current sensor. In addition to system sensors 112, a memory storing a database or historical table 113 may provide various platform and historical data, such as reliability information, processor performance metrics, and performance profile information. The database or historical table 113 may be maintained within control software or provided externally.

Conventionally, the ability of the CPU 106 to request the voltage regulator controller 102 cause the power supply 110 to deliver a particular amount of current (i.e., corresponding to a desired power state) was limited by the communication protocol implemented between the CPU 106 and the voltage regulator 102 (i.e., SVID interface 114 in the example of FIG. 1a). Thus, to the extent that the CPU 106 desired to operate at a power state in excess of, for example, 255 A, this power state could not be attained for any amount of time. It is noted that the power supply 110 itself is capable of delivering more amperage (e.g., 300 A, 400 A, or more) and the CPU 106 is capable of tolerating such increased amperage to allow a higher performance level.

Thus, examples of the present disclosure leverage power control software 104, in this case implemented at the voltage regulator controller 102, to determine that the CPU 106 is capable of operating at a power state different than that requested via the SVID interface 114, and cause the power supply 110 to deliver an amount of amperage to the CPU 106 corresponding to the determined, different power state. The power control software 104 may receive contextual data from the system sensor(s) 112 and/or the database 113 and determine, based on familiarity with the particular system 100 design, that the CPU 106 is capable of operating at a higher power state than the CPU may itself request or a higher power state than that which can be requested due to protocol limitations.

For example, assume that a power state of P0 corresponds to an amperage requirement of 300 A. The power control software 104 determines, for example based on temperature data from the sensor 112, that the CPU 106 may safely operate at P0, despite the fact that the CPU 106 itself cannot request that amount of current from the voltage control regulator 102 due to limitations imposed by the SVID interface 114. In such a scenario, the power control software 104 interjects and rather than using the CPU's 106 request for certain amperage from the power supply 110, causes the voltage regulator controller 102 to generate a PWM signal 116 that causes the power supply 110 to deliver 300 A to the CPU 106. In essence, the power control software 104 "ignores" the request from the CPU 106 because the software 104 is aware that the CPU 106 can actually safely tolerate a higher power state or performance level.

Various other examples of such overriding behavior by the power control software 104 are similarly within the scope of the present disclosure. For example, the CPU 106 may request to transition from a higher power state to a lower power state, for example due to a perceived violation of specified thermal requirements (i.e., the CPU 106 believes itself to be operating at too high of a temperature, or at too high of a temperature for too long). However, the power control software 104 may then cause (via the voltage control regulator 102) the power supply 110 to deliver an amount of power/current that is greater than the requested lower power state, knowing that based on contextual information, such as temperature, airflow, fan ramp rates, and overall system design, that the CPU 106 may safely operate at a higher power state than that which was requested by the CPU 106. To reiterate, in this example, the CPU 106 itself requests a lower power state due to a perceived violation of thermal requirements in the fixed specification for the CPU 106.

In another situation, where for example a higher reliability or lower power consumption is more important, the CPU 106 may request to transition from a lower power state to a higher power state, for example because the CPU 106 is well below its thermal limits. In this case, the power control software 104 may then cause (via the voltage control regulator 102) the power supply 110 to deliver an amount of power/current that is less than the requested higher power state, knowing that for the particular system design, it is preferable to remain at a lower power state to reduce power consumption or improve reliability.

Thus, not only do examples of the present disclosure overcome limitations imposed by legacy power control communication protocols (e.g., the inability to request more than 255 A over a SVID interface), but also enable tailoring CPU 106 power supply behavior to particular system requirements. In particular, a fixed-design or "locked" CPU 106 may be utilized to provide cost savings, while still allowing tailored CPU 106 behavior for particular use cases due to the power control software 104 causing the voltage control regulator 102 to control the power supply 110 accordingly.

Figure 1B:
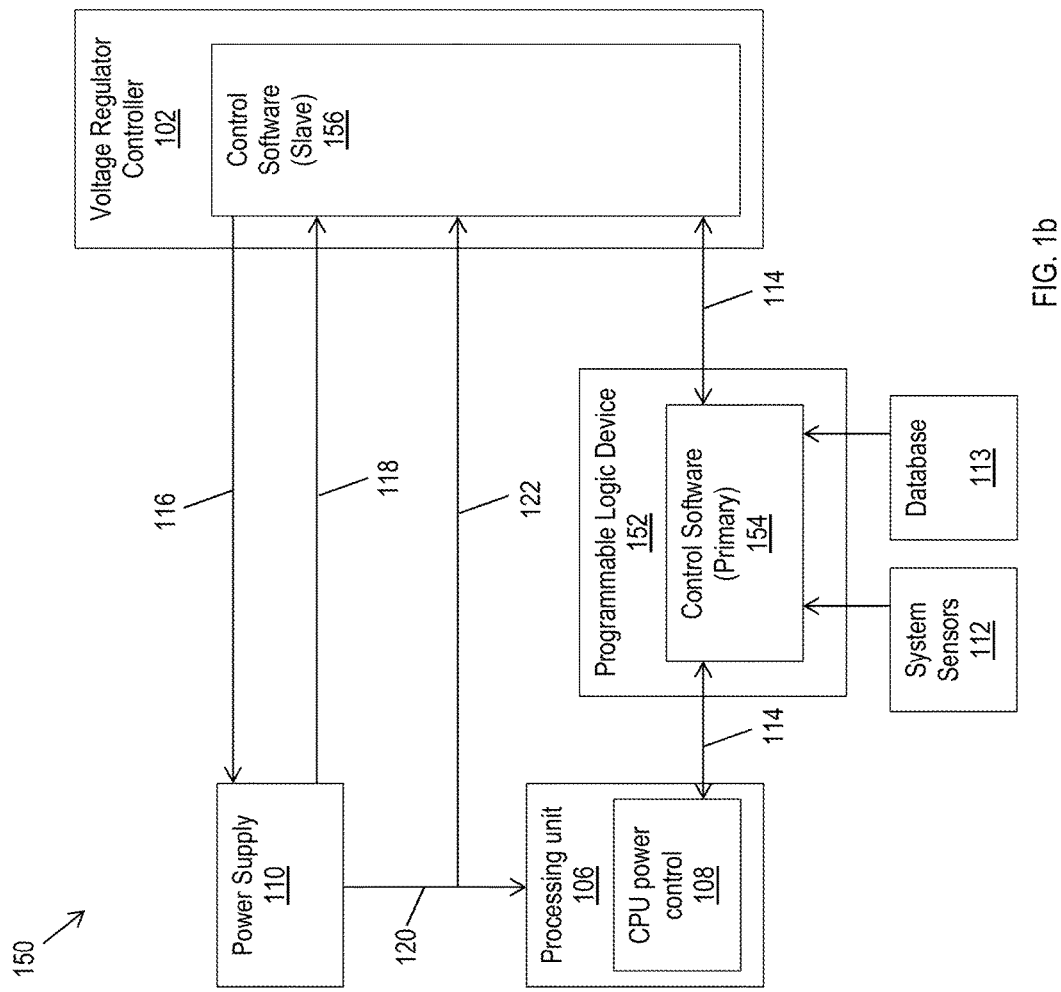

In certain cases, older or legacy voltage regulator controller 102 designs may not permit the controller 102 to interface directly with system sensors 112 and/or database 113, which may be aftermarket additions to the CPU 106 and associated motherboard. In such situations, alternate examples of the present disclosure such as that shown in FIG. 1b may be employed. FIG. 1b shows an alternate system 150, in which elements similar to those shown in FIG. 1a are depicted using like reference numerals.

The system 150 differs from the system 100 of FIG. 1a in that a programmable logic device 152 is coupled to and implemented between the CPU 106 and the voltage regulator controller 102. In some embodiments, the programmable logic device 152 may be part of a baseboard management controller (BMC). The programmable logic device 152 is capable of interfacing with system sensors 112 and/or database 113, to address the problems caused by legacy voltage regulator controllers 102, which may not be capable of interfacing with system sensors 112 and/or database 113. Thus, in the system 150, power control software 154 is also implemented on the programmable logic device 152 to provide functionality similar to that described above. Additionally, a slave version of the power control software 156 may be implemented at the voltage regulator controller 102 to ultimately cause the voltage regulator controller 102 to control the power supply 110 as specified by the primary power control software 154. Aside from the interface with the system sensors 112 and database 113, the function of the system 150 is similar to that described above with respect to the system 100 of FIG. 1a.

Figure 2:
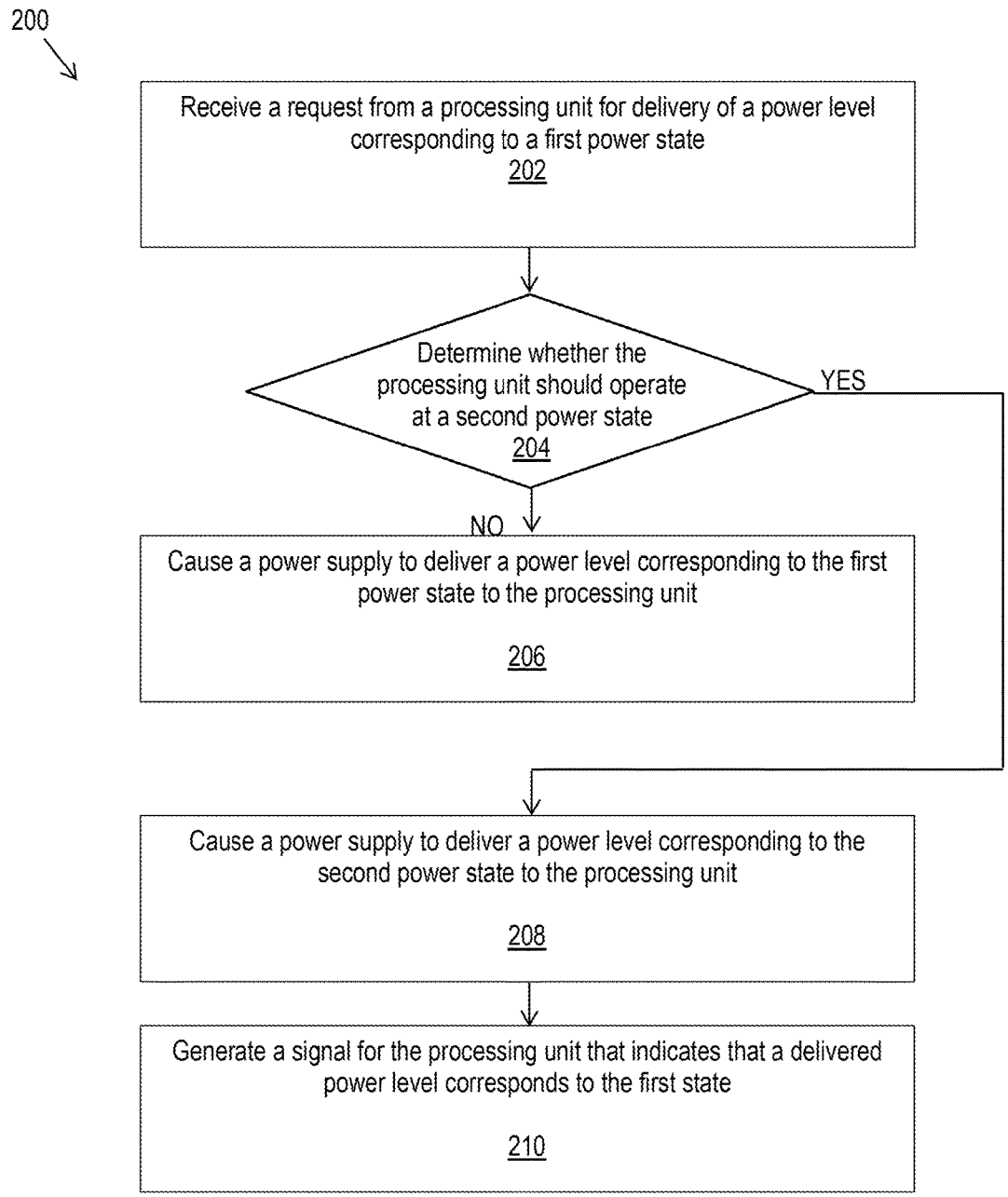
FIG. 2 shows a flow chart of a method for controlling power delivery to a processing unit in accordance with various examples of the present disclosure.

FIG. 2 shows a method 200 of controlling power delivery to a processing unit in accordance with examples of the present disclosure. The method 200 begins in block 202 when a request is received (e.g., by power control software 104) from a processing unit (e.g., CPU 106) for delivery of a power level corresponding to a first power state. The method 200 continues in block 204 with determining whether the CPU 106 should operate at a second power state, where the second power state is different than the first power state requested by the CPU 106. As explained above, in various examples the determined second power state may be higher (e.g., where it is known that the CPU 106 is capable of operating at a higher performance and power level safely) or lower (e.g., where greater reliability or reduced power consumption are of increased importance) than the power state requested by the CPU 106. For example, contextual knowledge of system design may result in the determination that although an ambient or CPU 106 temperature exceeds a particular CPU 106 specification-based threshold (i.e., the CPU 106 would request a lower power state as a result), the CPU 106 may safely operate at a higher power state since, for example, a fan speed, fan ramp rate, or thermal trend for the system indicates that the thermal excursion above the threshold is acceptable.

If it is determined in block 204 that the CPU 106 should not operate at the second power state (i.e., the requested first power state is appropriate), then the method 200 continues in block 206 with causing the power supply (e.g. a power FET of the power supply 110) to deliver a power level corresponding to the requested first power state to the CPU 106. However, if it is determined in block 204 that the CPU 106 should operate at the second power state (i.e., the requested first power state is inappropriate given other contextual information about various system or CPU 106 conditions), then the method 200 continues in block 208 with causing the power supply to deliver a power level corresponding to the second power state to the CPU 106. Further, in certain embodiments, the method 200 may continue in block 210 with generating a signal for the CPU 106 (e.g., a signal that is transmitted to the CPU 106) that indicates that a delivered power level to the CPU corresponds to the first state, rather than the second state actually delivered in block 208. That is, a signal is provided to the CPU 106 indicating a delivered voltage and/or current that differs from the actual voltage and/or current being delivered by the power supply, effectively "spoofing" the CPU 106.

The method 200 overcomes limitations imposed by legacy power control communication protocols (e.g., the inability to request more than 255 A over a SVID interface) and permits tailoring the CPU 106 power supply behavior to particular system requirements.

Figure 3:
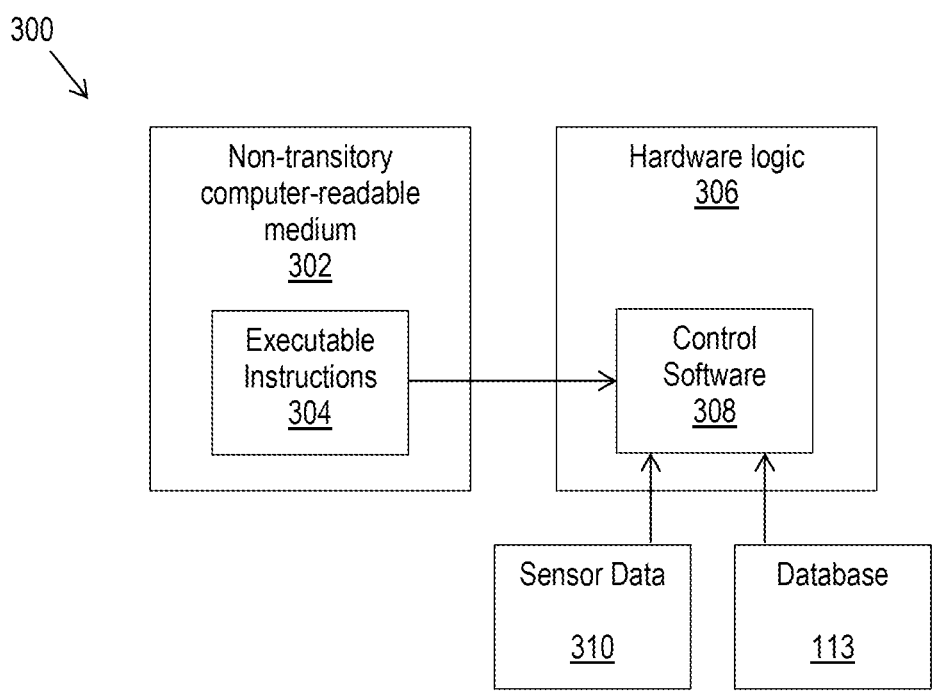
FIG. 3 shows a block diagram of a non-transitory computer-readable medium and associated hardware logic circuit for controlling power delivery to a processing unit in accordance with various examples of the present disclosure.

Turning now to FIG. 3, a system 300 is depicted that includes a non-transitory computer-readable medium 302 that contains executable instructions 304. In accordance with examples of the present disclosure, such instructions 304 may be implemented and executed on hardware logic circuit 306 as power control software 308 (i.e., corresponding to power control software 104, 154 described above with respect to FIGS. 1a and 1b). The hardware logic circuit 306 may comprise an application-specific integrated circuit, a programmable logic device, a microcontroller, or other combinations of transistors, logic gates, and the like configured to execute instructions 304 as power control software 308. As explained, the hardware logic circuit 306 may be part of the voltage regulator controller 102.

The hardware logic circuit 306 may alternately comprise programmable logic device 152, for example where the voltage regulator controller 102 is incapable of interfacing with system sensors 112 and/or database 113, and such interface is desired or required. In examples in which the hardware logic circuit comprises a programmable logic device 152 separate from the voltage regulator controller 102, the voltage regulator controller 102 may also comprise a slave version of the power control software 156 to facilitate the control of the power supply 110 by the voltage regulator controller 102 on instruction from the power control software 154 associated with the programmable logic device. The hardware logic circuit 306 and the power control software 308 may receive sensor data 310 as input (s), for example from system sensors 112 or the database 113, described above. Regardless of the particular implementation of the power control software 308, the executable instructions 304, when executed by any hardware logic circuit 306, carry out all or portions of the various functionality described herein.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to. . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present disclosure. Numerous variations and modifications will become apparent to those skilled in the art once the above disclosure is fully appreciated. For example, while generally described with regard to a CPU, it should be appreciated that the scope of the disclosed embodiments extends to various processing units having multiple power states. It is intended that the following claims be interpreted to embrace all such variations and modifications.

The invention claimed is:

1. A system, comprising: a processing unit configured to operate at a plurality of power states; a sensor to generate a sensor signal indicative of a parameter; a power supply configured to deliver power levels corresponding to the plurality of power states to the processing unit; and a hardware logic circuit coupled to the processing unit and configured to execute power control software to: receive a request from the processing unit for delivery of a power level corresponding to a first power state; receive the sensor signal from the sensor; determine, in response to the request and based on the sensor signal, that the processing unit should operate at a second power state, the second power state being higher than the requested first power state; and cause the power supply to deliver a power level corresponding to the second power state to the processing unit.

2. The system of claim 1 wherein the system sensor comprises at least one selected from the group consisting of: an ambient temperature sensor, a processing unit temperature sensor, a fan speed sensor, a fan ramp rate sensor, a processor package voltage sensor, an electronic component voltage sensor, and a processing unit current sensor.

3. The system of claim 1 further comprising a memory storing a database comprising historical or system performance data, wherein the hardware logic is configured to determine that the processing unit should operate at the second state based on the historical or system performance data.

4. The system of claim 1 further comprising a voltage regulator controller, wherein the hardware logic circuit is implemented on the voltage regulator controller.

5. The system of claim 1 further comprising:
a voltage regulator controller; and
a programmable logic device between and coupled to each of the processing unit and the voltage regulator controller;
wherein the hardware logic circuit is implemented on the programmable logic device; and
wherein the voltage regulator controller is configured to implement a slave version of the power control software.

6. A system, comprising: a memory storing a database comprising historical or system performance data; and hardware logic coupled to the memory and configured to execute power control software to: receive a request from a processing unit for delivery of a power level corresponding to a first power state; determine, in response to the request and based on the historical or system performance data from the database, that the processing unit should operate at a second power state, the second power state being different than the requested first power state; and cause a power supply to deliver a power level corresponding to the second power state to the processing unit.

7. The system of claim 6 wherein the request for delivery of the power level corresponding to the first state comprises a request to transition from a state associated with a higher power level to the first state, the hardware logic further configured to cause the power supply to deliver a power level greater than the power level associated with the first state.

8. The system of claim 6 wherein the request for delivery of the power level corresponding to the first state comprises a power value that is limited in quantity by a communication protocol between the processing unit and the power controller, the hardware logic further configured to cause the power supply to deliver a power level greater than the power value.

9. The system of claim 6 wherein the request for delivery of the power level corresponding to the first state comprises a request to transition from a state associated with a lower power level to the first state, the hardware logic further configured to cause the power supply to deliver a power level less than the power level associated with the first state.

10. The system of claim 6 further comprising a system sensor, wherein the hardware logic is configured to determine that the processing unit should operate at the second state based on data received from the system sensor indicative of a parameter or parameters sensed by the system sensor.

11. The system of claim 6 wherein the hardware logic comprises a baseboard management controller (BMC).

12. The system of claim 6 further comprising a voltage regulator controller, wherein the hardware logic is implemented on the voltage regulator controller.

13. The system of claim 6 further comprising:
a voltage regulator controller; and
a programmable logic device between and coupled to each of the processing unit and the voltage regulator controller;
wherein the hardware logic is implemented on the programmable logic device; and
wherein the voltage regulator controller is configured to implement a slave version of the power control software.

14. A method, comprising: receiving, at a power controller, a request from a processing unit for delivery of a power level corresponding to a first power state; determining, in response to the request and based on a sensor signal, that the processing unit should operate at a second power state, the second power state being different than the requested first power state; and causing a power supply to deliver a power level corresponding to the second power state to the processing unit.

15. The method of claim 14 wherein the request for delivery of the power level corresponding to the first state comprises a request to transition from a state associated with a higher power level to the first state, the method further comprising causing the power supply to deliver a power level greater than the power level associated with the first state.

16. The method of claim 14 wherein the request for delivery of the power level corresponding to the first state comprises a power value that is limited in quantity by a communication protocol used by the processing unit and the power controller, the method further comprising causing the power supply to deliver a power level greater than the power value.

17. The method of claim 14 wherein the request for delivery of the power level corresponding to the first state comprises a request to transition from a state associated with a lower power level to the first state, the method further comprising causing the power supply to deliver a power level less than the power level associated with the first state.

18. The method of claim 14 further comprising generating a signal for the processing unit that indicates that a delivered power level corresponds to the first state.

* * * * *